United States Patent
Hepler

(10) Patent No.: US 10,047,843 B2
(45) Date of Patent: Aug. 14, 2018

(54) TORQUE CONVERTER CORE RING

(71) Applicant: Schaeffler Technologies AG & Co. KG, Herzogenaurach (DE)

(72) Inventor: Aaron Hepler, Twinsburg, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 218 days.

(21) Appl. No.: 15/067,800

(22) Filed: Mar. 11, 2016

(65) Prior Publication Data

US 2017/0261083 A1   Sep. 14, 2017

(51) Int. Cl.
*F16H 41/28* (2006.01)

(52) U.S. Cl.
CPC .................. *F16H 41/28* (2013.01)

(58) Field of Classification Search
CPC ........................................... F16H 41/28
See application file for complete search history.

(56) References Cited

U.S. PATENT DOCUMENTS

| 5,065,509 | A | | 11/1991 | Sahashi | |
|---|---|---|---|---|---|
| 5,706,656 | A | * | 1/1998 | Hinkel | B21D 53/267 29/889.5 |
| 5,771,691 | A | * | 6/1998 | Kirkwood | F16H 45/02 416/197 C |
| 2011/0289909 | A1 | * | 12/2011 | Marathe | F16H 41/26 60/330 |

* cited by examiner

*Primary Examiner* — Thomas E Lazo
(74) *Attorney, Agent, or Firm* — Davidson, Davidson & Kappel, LLC

(57) ABSTRACT

A torque converter core ring is provided. The torque converter core ring includes an inner circumference, an outer circumference, radially outer slots extending radially inward from the outer circumference and radially inner slots extending radially outward from the inner circumference. A method of forming a torque converter torus component is also provided. The method includes fixing a plurality of blades to a shell, each of the blades including radially inner tabs and radially outer tabs; forming a core ring to include an inner circumference, an outer circumference, radially outer slots extending radially inward from the outer circumference and radially inner slots extending radially outward from the inner circumference; and fixing the core ring and the blades together by providing each of the radially inner tabs into one of the radially inner slots and providing each of the radially outer tabs into one of the radially outer slots.

13 Claims, 4 Drawing Sheets

_US 10,047,843 B2_

1

TORQUE CONVERTER CORE RING

The present disclosure relates generally to impellers and/or turbines of torque converters and more specifically to core rings of impellers and/or turbines of torque converters.

BACKGROUND

U.S. Pat. No. 5,065,509 discloses a torque converter including a conventional core ring, in which slots are formed in the interior of the core ring between an inner circumference and an outer circumference thereof.

SUMMARY OF THE INVENTION

A torque converter core ring is provided. The torque converter core ring includes an inner circumference, an outer circumference, radially outer slots extending radially inward from the outer circumference and radially inner slots extending radially outward from the inner circumference.

A torque converter is also provided that includes an impeller including an impeller shell, an impeller core ring and impeller blades fixed to the impeller shell and the impeller core ring; and a turbine including a turbine shell, a turbine core ring and turbine blades fixed to the turbine shell and the turbine core ring. At least one of the impeller core ring and the turbine core ring including radially outer slots extending radially inward from the outer circumference and radially inner slots extending radially outward from the inner circumference.

A method of forming a torque converter torus component is also provided. The method includes fixing a plurality of blades to a shell, each of the blades including radially inner tabs and radially outer tabs; forming a core ring to include an inner circumference, an outer circumference, radially outer slots extending radially inward from the outer circumference and radially inner slots extending radially outward from the inner circumference; and fixing the core ring and the blades together by providing each of the radially inner tabs into one of the radially inner slots and providing each of the radially outer tabs into one of the radially outer slots.

BRIEF DESCRIPTION OF THE DRAWINGS

The present invention is described below by reference to the following drawings, in which.

DETAILED DESCRIPTION

The disclosure provides an unbrazed core ring design having dual slots, one at the inner diameter and the other at the outer diameter of core ring, allowing for blades to have two core ring tabs bendable upon tab rolling to secure to the core ring to the blades.

Figure 1:
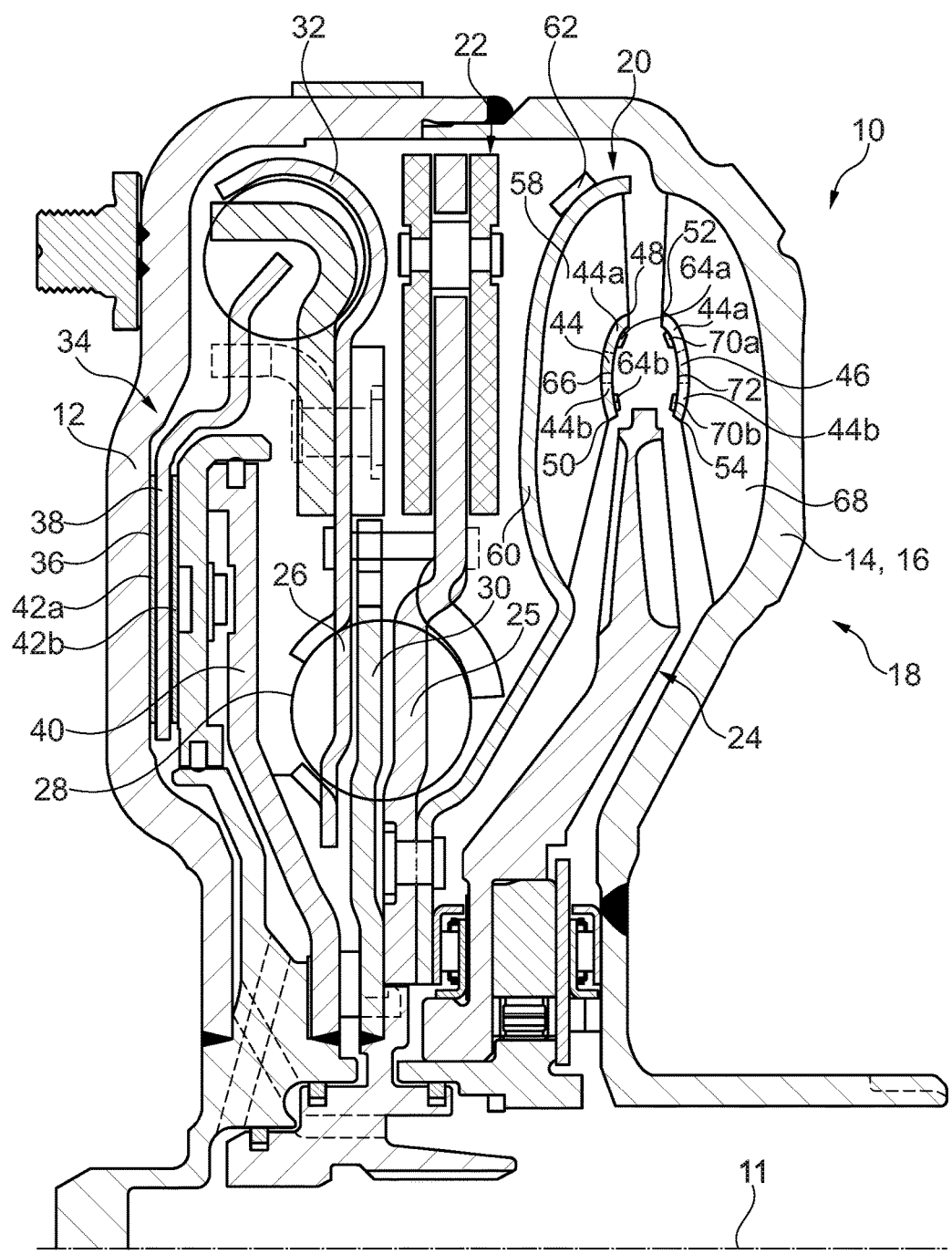
FIG. 1 schematically shows a cross-sectional side view of a torque converter core ring according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 formed in accordance with an embodiment of the present invention, which is positioned opposite impeller 18, and a damper assembly 22 fixed to turbine 20. Torque converter 10 further includes a stator 24 axially between impeller 18 and turbine 20. Impeller 18, turbine 20 and stator 24 together form a torus of torque converter 10.

On a front-cover side of turbine 20, turbine 20 is connected to damper assembly 22. Damper assembly 22 includes two cover plates 25, 26 supporting an inner set of springs 28 axially therebetween, with the turbine-side cover plate 25 being riveted to turbine 20. Damper assembly 22 further includes a drive flange 30 positioned axially between cover plates 25, 26 configured for nonrotatably connecting to a transmission input shaft. Cover plates 25, 26 transfer torque from turbine 20 to drive flange 30 via springs 28 and drive flange 30 in turn drives the transmission input shaft. A radially outer end of cover plate 26 forms a spring retainer 32 retaining a set of radially outer springs 34.

Torque converter 10 also includes a lockup clutch 34, which in this embodiment is formed by an inner radially extending surface 36 of front cover 12, a clutch plate 38 and a piston 40. Clutch plate 38 includes friction material 42a, 42b on both axial facing radially extending surfaces thereof. When lockup clutch 34 is in an unlocked state, torque from the engine is transferred from impeller 18 to turbine 20 via fluid flow, and turbine 20 drives the transmission input shaft via damper assembly 22. When lockup clutch 34 is in a locked state, torque from the engine is transferred from front cover 12 to damper assembly 22 via clutch 34 and damper assembly 22 in turn drives the transmission input shaft.

Turbine 20 and impeller 18 are formed in accordance with an embodiment of the invention, with turbine 20 including a core ring 44 and impeller 18 including a core ring 46. In contrast to conventional core rings, core ring 44 includes radially outer slots 44a extending radially inward from outer circumferential surface 48 and radially inner slots 44b extending radially outward from inner circumferential surface 50. Similarly, core ring 46 includes radially outer slots 46a extending radially inward from outer circumferential surface 52 and radially inner slots 46b extending radially outward from inner circumferential surface 54.

Turbine 20 further includes a turbine shell 56 and turbine blades 58, which are fixed to turbine shell 60 and core ring 44. Blades 58 are fixed at an engine side thereof to turbine shell 56 by tabs 62 and are each fixed to core ring 44 at a transmission side thereof by tabs 64a, 64b. Tabs 64a each extend through one of slots 44a and are bent to contact a radially extending transmission side surface 66 of core ring 44 and tabs 64b each extend through one of slots 44b and are bent to contact radially extending transmission side surface 66.

Impeller 18 further includes impeller blades 68 that are fixed to shell 16 and to core ring 46. Blades 68 are fixed at a transmission side thereof to impeller shell 16 and are each fixed to core ring 46 at an engine side thereof by tabs 70a, 70b. Tabs 70a each extend through one of slots 46a and are bent to contact a radially extending engine side surface 72 of core ring 46 and tabs 70b each extend through one of slots 46b and are bent to contact radially extending engine side surface 72.

Figure 2:
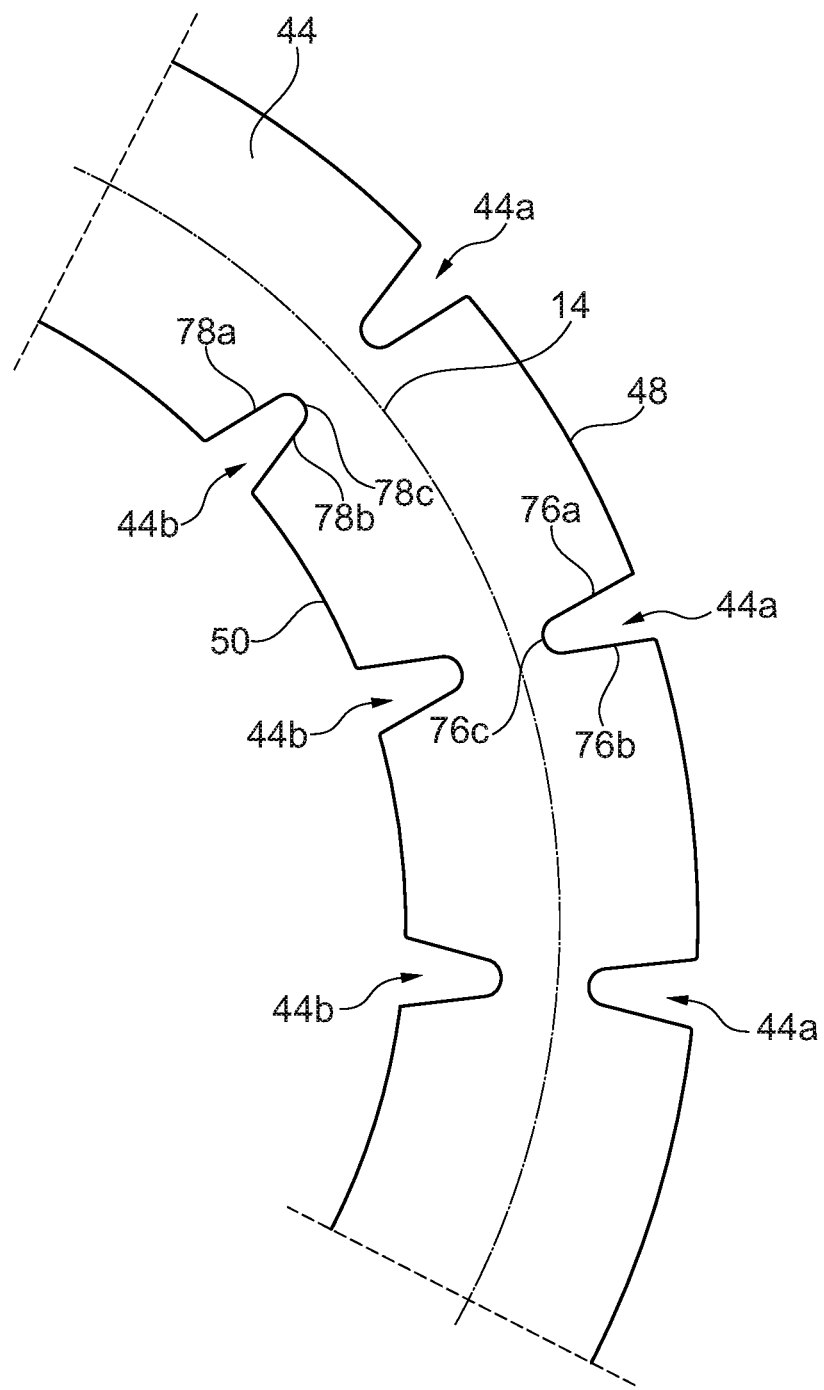
FIG. 2 shows a plan view of a section of one of the core rings of the torque converter shown in FIG. 1.

FIG. 2 shows a plan view of a section of core ring 44. Core ring 46 is configured in the same manner as core ring 44. As shown in FIG. 2, slots 44a extend radially inward from outer circumference 48 toward a center circle 74 thereof, with center circle 74 being equidistant between outer circumference 48 and inner circumference 50. Slots 44a are each defined by edges 76a, 76b, which each extend radially inward from outer circumference 48 toward center circle 74 and meet at a radially innermost tip 76c of slot 44a. Slots 44b extend radially outward from inner circumference 50 toward center circle 74. Slots 44b are each defined by edges 78a, 78b, which each extend radially outward from inner circumference 50 toward center circle 74 and meet at a radially innermost tip 78c of slot 44b.

Figure 3:
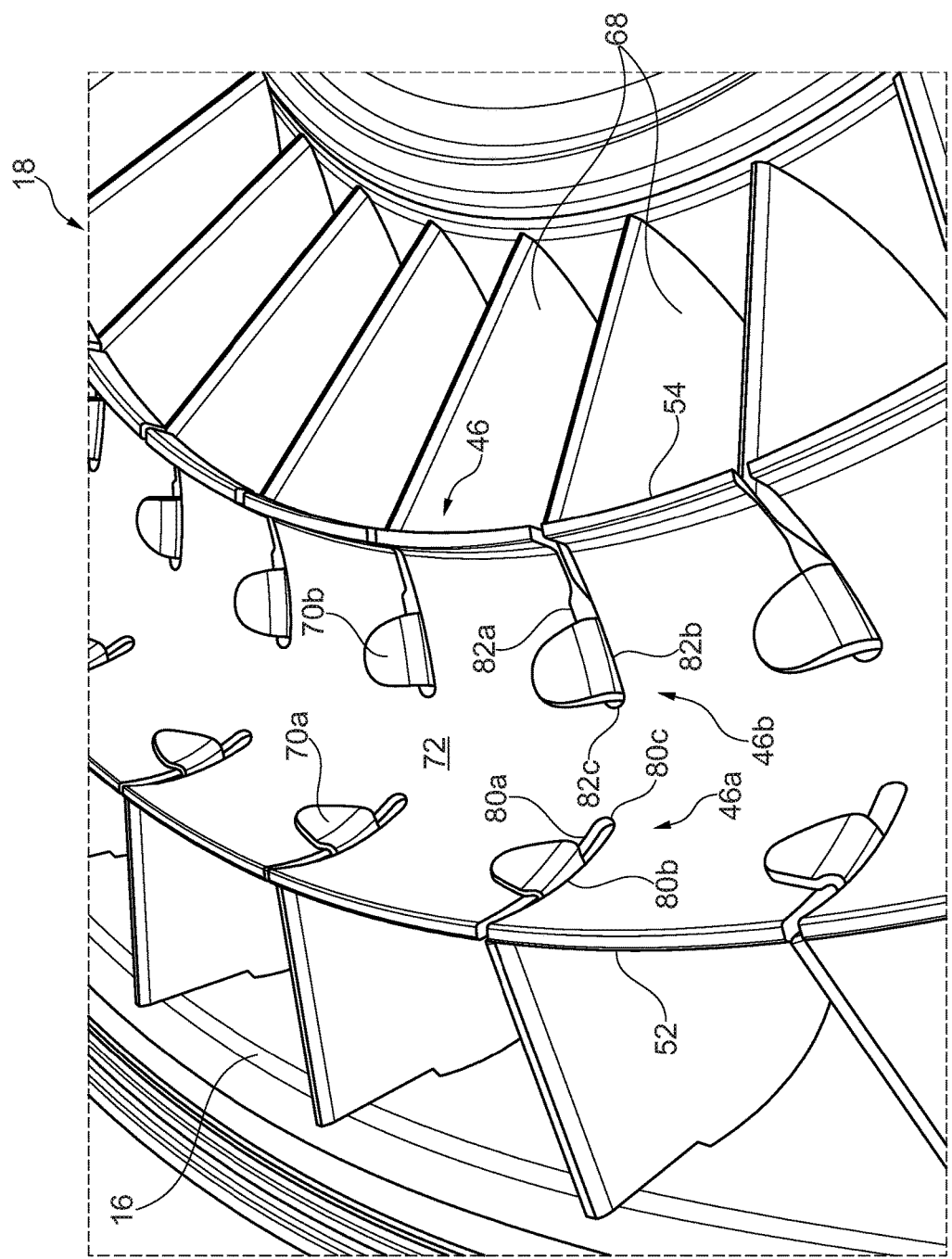
FIG. 3 shows a perspective view of the impeller of the torque converter shown in FIG. 1.
Figure 4:
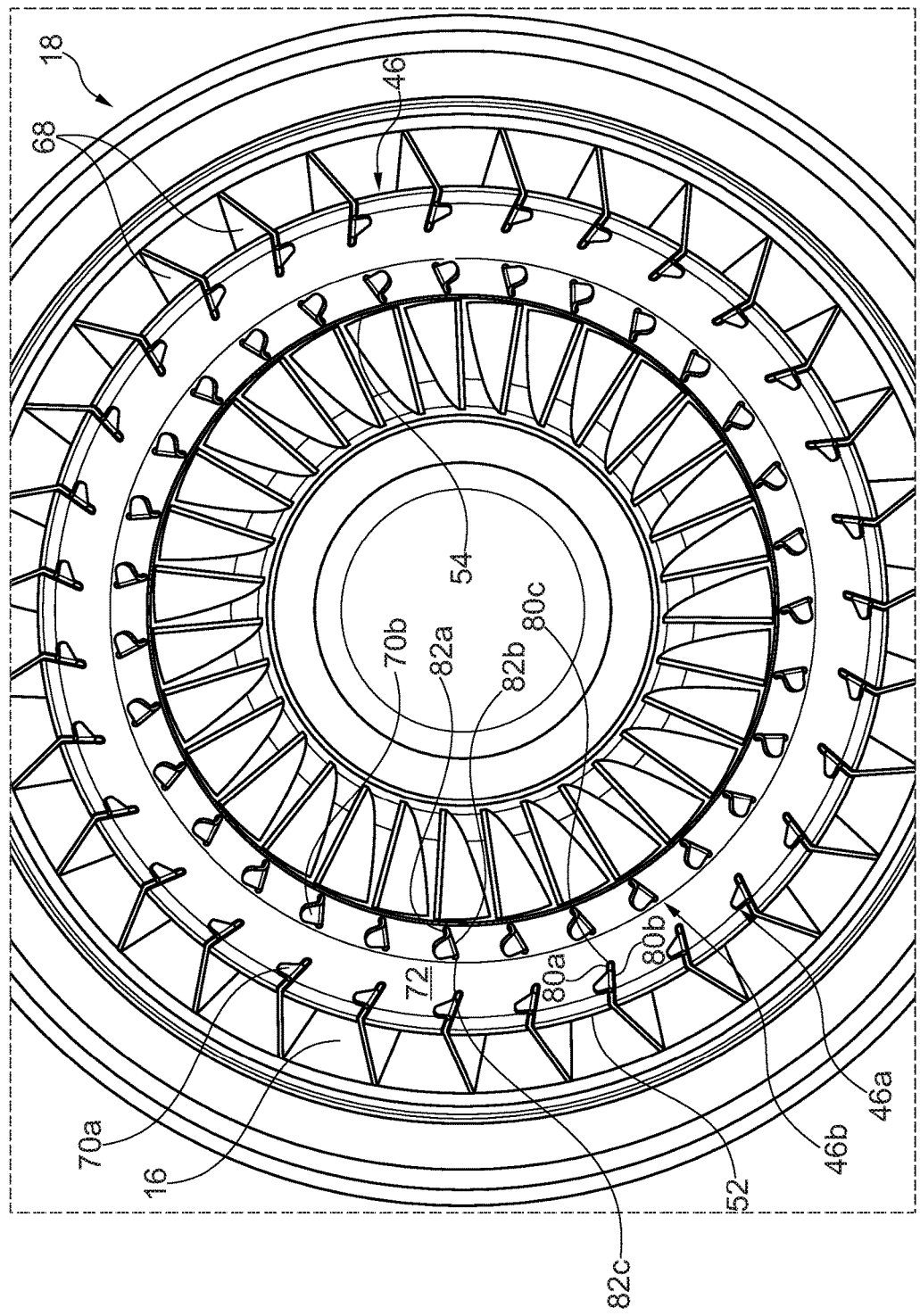
FIG. 4 shows a plan view of the impeller shown in FIG. 3.

FIG. 3 shows a perspective view of impeller 18 and FIG. 4 shows a plan view of impeller 18. Turbine blades 58 are fixed to core ring 44 in the same manner as impeller blades 68 are fixed to core ring 46. Slots 46a extend radially inward from outer circumference 52 and slots 46a are each defined by edges 80a, 80b, which each extend radially inward from outer circumference 52 toward and meet at a radially innermost tip 80c of slot 46a. Slots 46b extend radially outward from inner circumference 54 and slots 46b are each defined by edges 82a, 82b, which each extend radially outward from inner circumference 54 toward and meet at a radially innermost tip 82c of slot 46b. Tabs 70a each extend axially through one of slots 46a and are bent over to extend circumferentially over the respective edge 80a and into contact with radially extending engine side surface 72 of core ring 46. Similarly, tabs 70b each extend axially through one of slots 46b and are bent over to extend circumferentially over the respective edge 82a and into contact with radially extending engine side surface 72 of core ring 46.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter core ring comprising:
   an inner circumference defining a radially inner edge of the torque converter core ring;
   an outer circumference defining a radially outer edge of the torque converter core ring;
   radially outer slots intersecting the radially outer edge and extending radially inward from the radially outer edge; and
   radially inner slots intersecting the radially inner edge and extending radially outward from the radially inner edge.

2. The torque converter core ring as recited in claim 1 wherein the radially outer slots are each defined by edges extending radially inward from the outer circumference and meeting at a radially innermost tip.

3. The torque converter core ring as recited in claim 1 wherein the radially inner slots are each defined by edges extending radially outward from the inner circumference and meeting at a radially outermost tip.

4. A torque converter comprising:
   an impeller including an impeller shell, an impeller core ring and impeller blades fixed to the impeller shell and the impeller core ring; and
   a turbine including a turbine shell, a turbine core ring and turbine blades fixed to the turbine shell and the turbine core ring, at least one of the impeller core ring and the turbine core ring being the torque converter core ring as recited in claim 1.

5. The torque converter as recited in claim 4 wherein the impeller blades and the turbine blades each include radially inner tabs and radially outer tabs connecting the impeller blades and the turbine blades to the respective impeller core ring or turbine core ring, the radially outer slots of the at least one of the impeller core ring and the turbine core ring receiving the radially outer tabs, the radially inner slots of the at least one of the impeller core ring and the turbine core ring and the turbine core ring receiving the radially inner tabs.

6. The torque converter as recited in claim 5 wherein the at least one of the impeller core ring and the turbine core ring includes a radially extending surface, the radially inner tabs and radially outer tabs being bent to contact the radially extending surface.

7. A method of forming a torque converter torus component comprising:
   fixing a plurality of blades to a shell, each of the blades including radially inner tabs and radially outer tabs;
   forming a core ring to include an inner circumference defining a radially inner edge of the core ring, an outer circumference defining a radially outer edge of the core ring, radially outer slots intersecting the radially outer edge and extending radially inward from the radially outer edge and radially inner slots intersecting the radially inner edge and extending radially outward from the radially inner edge; and
   fixing the core ring and the blades together by providing each of the radially inner tabs into one of the radially inner slots and providing each of the radially outer tabs into one of the radially outer slots.

8. The method as recited in claim 7 wherein the fixing the core ring and the blades together includes bending each of the radially inner tabs and radially outer tabs into contact with a radially extending surface of the core ring.

9. The method as recited in claim 8 wherein the radially outer slots are each defined by edges extending radially inward from the outer circumference and meeting at a radially innermost tip, the bending the radially outer tabs into contact with the radially extending surface including bending each of the radially outer tabs to extend circumferentially over one of the respective edges.

10. The method as recited in claim 8 wherein the radially inner slots are each defined by edges extending radially outward from the inner circumference and meeting at a radially outermost tip, the bending the radially inner tabs into contact with the radially extending surface including bending each of the radially inner tabs to extend circumferentially over one of the respective edges.

11. The method as recited in claim 7 wherein the torque converter torus component is a turbine.

12. The method as recited in claim 7 wherein the torque converter torus component is an impeller.

13. A torque converter core ring comprising:
   an inner circumference;
   an outer circumference;
   radially outer slots extending radially inward from the outer circumference; and
   radially inner slots extending radially outward from the inner circumference, wherein:
   the radially outer slots are each defined by edges extending radially inward from the outer circumference and meeting at a radially innermost tip, and/or the radially inner slots are each defined by edges extending radially outward from the inner circumference and meeting at a radially outermost tip.

\* \* \* \* \*